United States Patent Office 3,227,676
Patented Jan. 4, 1966

3,227,676
PHENOLS AND DILAURYLTHIODIPROPIONATE AS THERMAL STABILIZERS FOR OLEFIN POLYMERS
Kenneth R. Mills and Roger J. Walton, Bartlesville, Okla., assignors to Phillips Petroleum Company, a corporation of Delaware
No Drawing. Filed June 30, 1961, Ser. No. 120,963
2 Claims. (Cl. 260—45.85)

This invention relates to thermal stabilizers for olefin polymers.

Olefin polymers such as polyethylene, polypropylene, and the like have been widely used in the fabrication of films, fibers, and a variety of molded and extruded items. However, in some instances, particularly in applications of polypropylene in environments where elevated temperatures are encountered, thermal degradation of the polymer is encountered, resulting in surface cracking and deterioration both in appearance and physical properties. Numerous additives have been proposed for stabilization of these polymers against such degradation, few, if any, of which are entirely satisfactory.

We have now discovered that olefin polymers, particularly polypropylene, can be effectively stabilized against thermal degradation by incorporation therein of a synergistic combination of a dialkyl ester of a thio-dialiphatic carboxylic acid and a compound selected from the group consisting of 2,2′-isopropylidene-bis(6-cyclohexyl-p-cresol), 4,4′-isopropylidene-bis(2,6-dicyclohexylphenol), and 2 - (3 - carbo - n - amoxy - 4 - hydroxybenzyl) - 6 - (3-carboxy-4-hydroxybenzyl)-p-cresol.

The dialkyl esters of thiodicarboxylic acid are compounds of the general formula

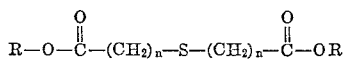

$$R-O-\overset{O}{\underset{\|}{C}}-(CH_2)_n-S-(CH_2)_n-\overset{O}{\underset{\|}{C}}-OR$$

in which R is an alkyl group containing from 8 to 18 carbon atoms and n is a number from 2 to 4, the R's being the same or different. Typical of these compounds and presently preferred is dilaurylthiodipropionate. Other useful compounds include dioctylthiodipropionate, dinonylthiodivalerate, didecylthiodibutyrate, dimyristylthiodipropionate, diceylthiodibutyrate, distearylthiodivalerate, decyl-laurylthiodipropionate, octyl-stearylthiodibutyrate, nonylmyristylthiodivalerate, and the like.

In the practice of the invention the stabilizers can be incorporated in the polymer by any suitable means. One method involves dissolving the mixture in a volatile solvent such as acetone and spraying the solution over the pulverized polymer. When desired further mixing can be effected by tumbing the treated powder in a drum or other similar means. After application of the stabilizer the solvent is removed by a current of air, heated if desired. The resulting treated polymer can be stored or removed for use in molding or extrusion procedures for the fabrication of film, fiber, or other utilitarian articles. When desired the stabilizing mixture can be incorporated by milling or kneading procedures such as, for example, in a Banbury mixer or a roll mill.

The stabilizing systems of the present invention are useful in any olefin polymer in which thermal degradation is a problem, such as polypropylene, poly-1-butene, poly-2-methylpentene, polyisobutylene, and the like.

The dialkylthiodicarboxylate and the 2,2′-isopropylidene-bis(6-cyclohexyl - p - cresol), 4,4′-isopropylidene-bis (2,6 - dicyclohexylphenol), or 2-(3-carbo-n-amoxy-4-hydroxybenzyl)-6-(3-carboxy-4-hydroxybenzyl)-p-cresol are employed in a ratio by weight of from 0.1:1.0 to 1.0:0.1 and the mixture is combined with the polymer in an amount from 0.01 to 1.0 percent. Larger amounts can be used if desired. When applied as a solution in acetone or the like, the concentration is not critical since the solvent is removed subsequent to application to the polymer. Generally from about 0.5 to 5.0 percent solutions are satisfactory. With solutions of concentrations in this range, adequate dispersion in the polymer at the desired stabilizer level can be realized.

EXAMPLE I

In a series of tests, finely ground polypropylene was sprayed with a 1.5 percent solution of stabilizer in acetone, using an atomizer. After treatment the acetone was evaporated and the polymer compression molded to form a slab 1/16 inch in thickness. From this slab strips 0.5 x 5 inches where cut for testing. In the tests the strips were hung in a circulating air oven at 150° C. and observed for development of embrittlement. Failure was indicated by breaking of the strips when subjected to 180° bend, the time to failure being recorded as a measure of effectiveness of the stabilizer. Data on these tests are shown in Table I. In these runs, the amount of each stabilizer applied was 0.1 percent by weight based on the polymer (exception, Run 8).

Table I

| Run No. | Stabilizer Used | Hours to Fail at 150° C. | |
|---|---|---|---|
| | | Without DLTDP [1] | With DLTDP [1] |
| 1 | 2,2′-isopropylidene-bis(6-cyclohexyl-p-cresol). | 42 | 68 |
| 2 | 4,4′-isopropylidene-bis(2,6-dicyclohexylphenol). | 90 | 220 |
| 3 | 2-(3-carbo-n-amoxy-4-hydroxybenzyl)-6-(3-carboxy-4-hydroxybenzyl)-p-cresol. | 67 | 115 |
| 4 | 2,2′methylene-bis(6-cyclohexyl-p-cresol). | <24 | <24 |
| 5 | 2,2′-methylene-bis[6(2-phenyl-2-propyl)-p-cresol]. | <24 | <24 |
| 6 | 2,2′-isopropyldiene-bis[6(2-phenyl-2-propyl)-p-cresol]. | <24 | <24 |
| 7 | DLTDP alone at 0.1 percent | <20 | <20 |
| 8 | DLTDP alone at 0.5 percent | <20 | <24 |

[1] Dilaurylthiodipropionate.

Runs 1–3 show good stabilization with synergistic mixtures of the present invention. Runs 4–6 show that certain related compounds do not give a significant improvement. Runs 7 and 8 show that dilaurylthiodipropionate alone at levels up to 0.5 percent is not effective for stabilization against thermal degradation.

The polypropylene used for these runs was prepared by polymerization in a 30-gallon glass lined Pfaudler reactor. After purging the reactor with nitrogen, 15 gallons of n-heptane (Phillips Pure Grade passed over molecular sieve) was charged. To this diluent was added 2.1 grams of titanium trichloride and 4.7 grams of triethylaluminum (27.7 ml. of 1.6 molar solution in n-heptane) as catalyst. The system was then purged three times with propylene after which 19.95 pounds of propylene was charged. The temperature was elevated to 215° F. and maintained in the range 215–230° F. for about 4.0 hours.

At the end of the reaction the reactor was cooled and the excess propylene vented. The polymer was quenched with water, removed from the reactor, washed and dried. Evaluation data on the product were as follows:

EVALUATION DATA

| | |
|---|---|
| Melt index [1] | 9.6 |
| Specific gravity | 0.8954 |
| Flexural modulus, p.s.i. | 109,000 |
| Shore D hardness | 65 |
| Tensile at yield, p.s.i. | 3300 |
| Elongation at break, percent | 25 |
| Zero strength temperature, °F.[2] | 297 |
| Heptane insolubles, percent [3] | 92.7 |
| Ash content, percent | 0.07 |

[1] ASTM D1238-57T with 21,600 gram load.
[2] Thomas: Injection Molding of Plastics, Reinhold 504 (1947).
[3] 2.5 grams extracted with 100 ml. heptane at 110° C. for 2 hours.

For the production of 2,2'-isopropylidene-bis(6-cyclohexyl-p-cresol), 38 grams of 2-cyclohexyl-p-cresol, 5.8 grams of acetone and 40 ml. of glacial acetic acid were mixed in a flask and cooled to a temperature between 0 and 5° C. Gaseous hydrogen chloride was passed into the solution with stirring, the flow being continued for 10 hours with the temperature at 0 to 5° C. The solution was then allowed to stand for several days after which it was washed with 10 percent aqueous methanol. The mixture was then extracted with ether. The extract was shaken with 10 percent sodium hydroxide, washed with water, and heated to remove ether, leaving a viscous crude product. This product was washed with 10 percent sodium hydroxide and recrystallized, once from alcohol and water and several times from alcohol. The product had a melting point of 125–6° C.

For the production of 4,4'-isopropylidene-bis(2,6-dicyclohexylphenol) a solution of 25.8 grams of 2,6-dicyclohexylphenol and 3.7 cc. of acetone in 30 cc. of glacial acetic acid was made up and cooled to 0° C. Into this solution was then passed a stream of HCl gas. After contacting the solution with HCl for 8 hours, the solution was placed in a refrigerator and maintained at approximately 30° F. for 36 hours. At the end of this time, a number of crystals had separated. These crystals were removed on a filter, washed with acetic acid, and dried over KOH. Nine grams of product was recovered, representing a yield of 33 percent of theoretical. Recrystallization of this material from heptane yielded 8.2 grams of material melting at 189–190° C. After again recrystallizing this material from heptane, the melting point was 190–191° C. The empirical formula for 4,4'-isopropylidene-bis(2,6-dicyclohexylphenol) is $C_{39}H_{56}O_2$ (total 556.8); the calculated carbon and hydrogen analysis for this material is C—84.12 weight percent, H—10.13 weight percent and O—5.57 weight percent. Analysis of this material showed 84.0 weight percent carbon and 9.3 weight percent hydrogen.

For the preparation of 2,2'-methylene-bis[6(2-phenyl-2-propyl)-p-cresol] the following procedure was employed. To 28 ml. concentrated hydrochloric acid was added 22.6 grams of 2(2-phenyl-2-propyl)-p-cresol and 8.1 grams of 37 percent formaldehyde. The mixture was heated on a steam bath for 1 hour at 95° C. with stirring after which 30 ml. toluene was added to give a better dispersion, heating being continued for another hour. After cooling and diluting with small amounts of toluene and ether the reaction mixture was washed several times with water. After drying over calcium sulfate, solvents were evaporated to yield a yellow viscous product. After standing several days in an ice box, this product was recrystallized from heptane to yield yellowish white crystals having a melting point of 84° C.

For the preparation of 2,2'-isopropylidene-bis[6(2-phenyl-2-propyl)-p-cresol] the following procedure was used. To 20 ml. glacial acetic acid was added 22 grams of 2(2-phenyl-2-propyl)-p-cresol and 2.9 grams acetone. Anhydrous hydrogen chloride was passed through this solution for 13 hours at a temperature of 0–5° C. After 8 days in the ice box, a small amount of yellow oil was separated at the bottom of the flask. This oil was separated, diluted with a small amount of ether and thoroughly washed, first with an aqueous solution of sodium carbonate, then with water. This product was dried over magnesium sulfate.

The above processes for the production of the additives are conventional and are known in the art.

For the production of 2-(3-carbo-n-amoxy-4-hydroxybenzyl)-6-(3-carboxy-4-hydroxybenzyl)-p-cresol, the process of Turk et al., Serial No. 104,808, filed April 24, 1961, was used. 175 grams (1.15 moles) of methyl salicylate was dissolved in 175 cc. of glacial acetic acid, after which 98 grams (1 mole) of concentrated sulfuric acid was added with stirring. The clear solution was then heated to 90–95° C., and 37 grams (0.22 mole) of 2,6-dimethylol-p-cresol was added in small portions with stirring at 95–100° C. The first addition turned the solution a bright green color, and with each addition the color became darker. After about half of the dimethylolcresol had been added, the mixture became turbid. Each addition caused a temperature rise of 2–3° C. The addition was completed in about 1.5 hours, then the mixture was stirred and held at 90–100° C. for 4 hours. The mixture was maintained at room temperature overnight, and finally heated to 90–95° C. for another 2 hours. After the reaction was completed in this manner, the sulfuric acid was neutralized by the slow addition of 280 grams of sodium acetate trihydrate. The majority of the acetic acid was stripped off with stirring under aspirator pressure, and the unreacted methyl salicylate was steam distilled from the residue. Cooling of the residue gave a viscous "tar" that was dissolved in benzene. The benzene solution was washed twice with water, and then extracted several times with 10% aqueous sodium hydroxide solution until the color was removed. The basic extracts were combined and acidified with hydrochloric acid, giving a dark colored oil. This oil was then hydrolyzed by refluxing with aqueous sodium hydroxide. Acidification of the hydroxylate gave a brown solid which was dissolved in dioxane. Treatment of the dioxane solution with charcoal and filtering removed part of the color. The dioxane filtrate was then diluted with ether and filtered. Evaporation of the clear yellow dioxane-ether filtrate gave a residue which was dissolved in hot toluene to which a little methanol was added to aid solution. Slow cooling and standing gave a pale yellow sludge, that when filtered and dried became a yellow powder, M.P. 225–235° C. Rrecrystallization of a small portion of the 11 gram sample above gave a material of M.P. 249–250° C. This material was 2,6-bis(3-carboxy-4-hydroxybenzyl)-p-cresol, empirical formula $C_{23}H_{20}O_7$ (M.W.=408, eq. w.—204). The calculated elemental analysis for this material is carbon—67.6 weight percent and hydrogen—4.9 weight percent. The percentages found by an elemental analysis were carbon—69.8 weight percent and hydrogen—5.0 weight percent. Titration of a sample of the material with standard base gave an equivalent weight of 207.

The acid which was prepared above was dissolved in 50 cc. of n-amyl alcohol, and to this solution was added 5–6 cc. of phosphorus oxychloride. The resulting solution was then heated under reflux for 85–90 hours. After cooling, the mixture was poured into ether, and the resulting solution was washed once with water, three times with saturated sodium bicarbonate solution, once with saturated sodium chloride solution to break an emulsion, and again with water. The solvent was then evaporated and the residue stripped under aspirator pressure on a steam bath for 30 minutes. The dark colored residue was dissolved in hot benzene-heptane mixture. Cooling of this solution gave an amorphous solid, M.P. 135–140° C. The yield was 2.2 grams. After recrystallization once from hot benzene-heptane mixture and once from benzene, 1.9 grams of a product melting at 162–165° C. was obtained. Recrystallization of a small sample three times from benzene gave a material M.P. 166.5–167° C. This material was 2-(3-carbo-n-amoxy-4-hydroxybenzyl)-6-(3-carboxy-4-hydroxybenzyl)-p-cresol, empirical formula $C_{28}H_{30}O_7$. The calculated elemental analysis for this material is carbon—70.28 weight percent and hydrogen—6.32 weight percent. The percentages found were carbon 70.0 percent and hydrogen—6.6 percent.

EXAMPLE II

Similar synergistic results are obtained when the above runs are repeated using a ratio of dialkylthiodicarboxylate to second additive in a weight ratio of 0.1 to 1.0 and 1.0 to 0.1, the mixture combined with the polymer in an amount of from 0.01 to 1 percent.

As many possible embodiments can be made of this invention without departing from the scope thereof, it is to be understood that all matter herein set forth is to be interpreted as illustrative and not as unduly limiting the invention.

We claim:
1. Polypropylene and a thermal degradation stabilizing amount of a mixture of dilaurylthiodipropionate and 2 - (3 - carbo-n-amoxy-4-hydroxybenzyl)-6-(3-carboxy-4-hydroxybenzyl)-p-cresol, the additives being employed in a weight ratio of 0.1:1 to 1:0.1.

2. Polypropylene and 0.1 to 1 weight percent of a mixture of dilaurylthiodipropionate and 2-(3-carbo-n-amoxy-4-hydroxybenzyl)-6-(3-carboxy-4-hydroxybenzyl)-p-cresol in a weight ratio of 0.1:1 to 1:0.1.

References Cited by the Examiner
UNITED STATES PATENTS

| | | | |
|---|---|---|---|
| 2,563,835 | 8/1951 | Gribbins | 260—45.85 |
| 2,875,174 | 2/1959 | Webb | 260—45.95 |
| 2,956,982 | 10/1960 | McCall et al. | 260—45.85 |
| 2,972,597 | 2/1961 | Newland et al. | 260—45.85 |
| 2,985,617 | 2/1961 | Salyer et al. | 260—45.95 |
| 3,000,856 | 9/1961 | Newland et al. | 260—45.95 |
| 3,033,814 | 5/1962 | Tholstrup | 260—45.95 |

FOREIGN PATENTS 1,248,217  10/1960  France.

OTHER REFERENCES

Sun Oil Company (Belgium), 587,296 May 20, 1960 cited in Derwent—Belgian Abstracts, vol. 66A, July 15, 1960.

LEON J. BERCOVITZ, *Primary Examiner.*

A. D. SULLIVAN, *Examiner.*